No. 647,371. Patented Apr. 10, 1900.
A. C. BOSWORTH.
WEIGHING AND BAGGING MACHINE.
(Application filed Aug. 9, 1899.)

(No Model.)

WITNESSES:

INVENTOR
A. C. Bosworth
BY
ATTORNEYS

THE NORRIS PETERS CO., PHOTO-LITHO., WASHINGTON, D. C.

UNITED STATES PATENT OFFICE.

ALONZO CEMERRILL BOSWORTH, OF PUTNAM, CONNECTICUT.

WEIGHING AND BAGGING MACHINE.

SPECIFICATION forming part of Letters Patent No. 647,371, dated April 10, 1900.

Application filed August 9, 1899. Serial No. 726,657. (No model.)

*To all whom it may concern:*

Be it known that I, ALONZO CEMERRILL BOSWORTH, of Putnam, in the county of Windham and State of Connecticut, have invented a new and Improved Weighing and Bagging Machine, of which the following is a full, clear, and exact description.

One object of the invention is to provide a simple, durable, and inexpensive machine especially adapted for weighing and bagging grain.

A further object of the invention is to so construct the machine that it can be used in connection with any platform-scale and be so adjusted as to shut off the supply of grain the moment a certain weight of material is obtained and is indicated by the scale-beam properly balanced.

Another object of the invention is to mount a grain-receiving hopper upon the scale-beam and provide the hopper with means for holding a bag, and also to provide a support for the bottom of the bag capable of adjustment to hold bags of different lengths.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in the two figures.

Figure 1:
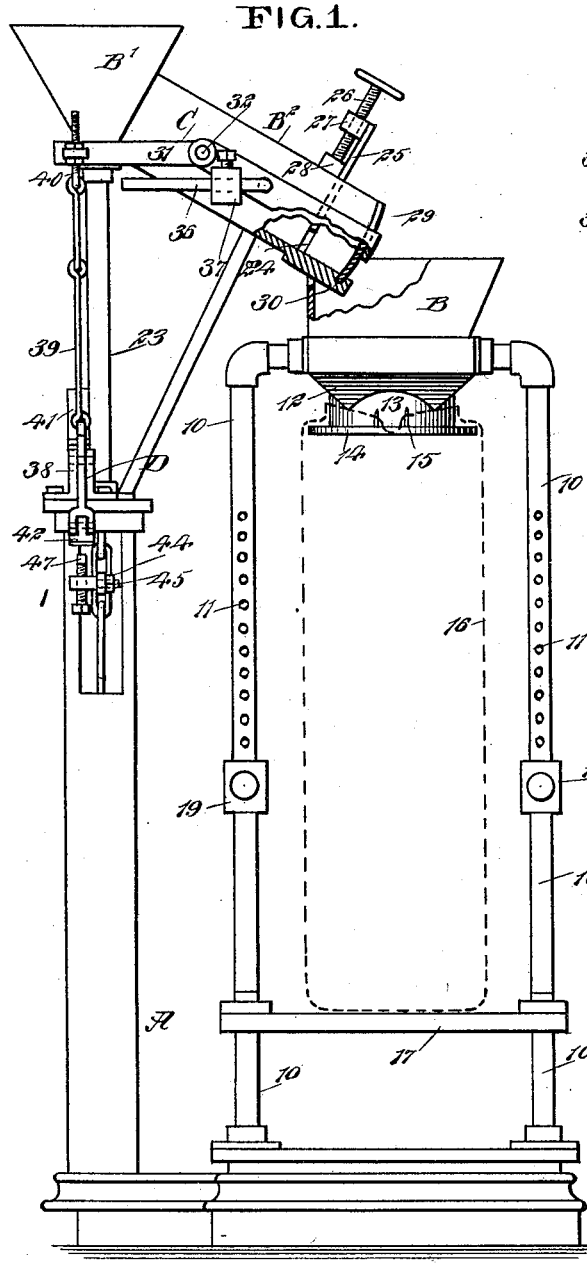
Figure 2:
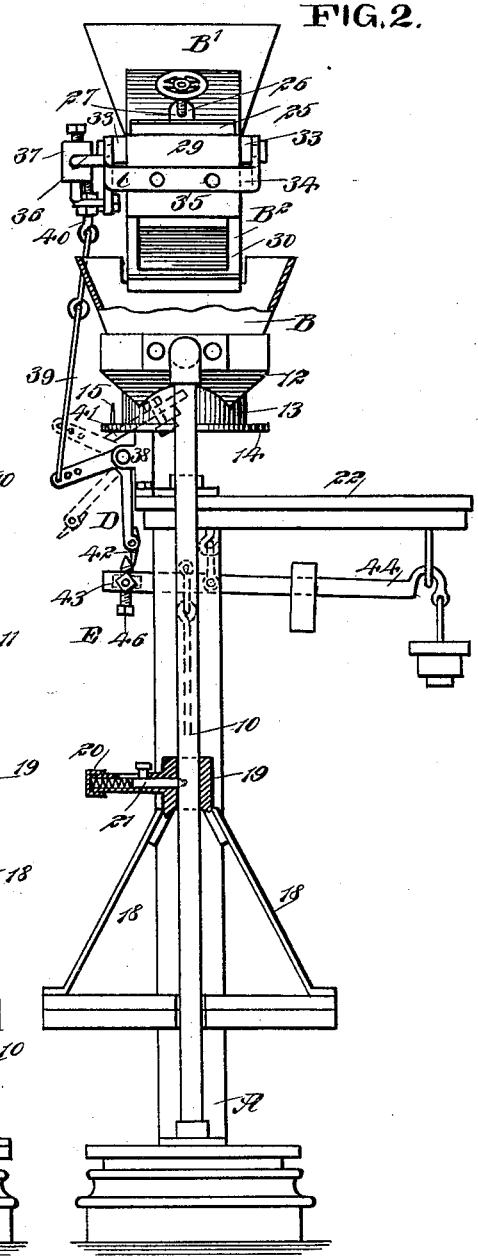

Figure 1 is a side elevation of the improved machine, parts being broken away and the chute being shown closed at its delivery end; and Fig. 2 is a rear elevation of the machine, parts being broken away and the delivery end of the chute being shown open.

The scale A is the usual platform-scale and may be of any type. Two uprights 10 are supported on the platform of the scale in any desired manner, and these uprights are provided with series of apertures 11 and at their upper ends support a hopper B, the delivery end 12 of the hopper being usually contracted. At said delivery end of the hopper B a sleeve or collar 13 is attached, provided with an outwardly-extending marginal flange 14 at its bottom and with pins 15, which extend upward from the flange, said pins 15 being adapted to pass through the upper portion of a bag 16, that is to be filled by the material emptied into the hopper B. The bottom of the bag 16 is supported upon a platform 17, adjustable upon the standards or uprights 10. At each end of the adjustable platform 17 a pair of braces 18 is located, the upper ends of each pair of braces being attached to a sleeve 19, and the said sleeves are mounted to slide on the uprights or standards 10. Each sleeve is provided with a horizontal casing 20, and in each casing a spring-controlled bolt 21 is mounted, adapted to enter the interior of a sleeve and in one of the apertures 11 in the standards or uprights 10. Under such construction the platform 17 can be adjusted and held in adjusted position. A second hopper B' is mounted upon the upper arm 22 of the scale A through the medium of a suitable standard 23, and a chute B² is connected at one end with the hopper B', the other end of said chute being supported by a brace extending to the upright of the scale A, as shown in Fig. 1. The said chute inclines downwardly from the receiving-hopper B'. This chute is closed at its sides, top, and bottom and is provided near its delivery end with interior vertical side grooves 24 and a corresponding slot in the top, the said slot and grooves being adapted to receive and guide a gate 25, the movement of which gate is effected and regulated through the medium of a screw 26, passed through a lug 27, secured to one side of said gate, the screw 26 having bearing at its lower end on a suitable support 28, carried by the chute, as shown in Fig. 1. The object of the gate 25 is to regulate the flow of grain from the receiving-hopper B', as some grain runs much more freely than others. The gate is therefore raised or lowered according to the character of grain that is to pass through the chute, providing a large opening for slowly-moving grain and a smaller opening or space for quickly-moving grain.

The supply of grain is cut off at the delivery end of the chute B² through the medium of an end gate 29. This end gate is mounted to slide vertically in the chute and when in its open position is adapted to extend out beyond the top of the chute. Furthermore, the said end gate 29, when it is closed, enters a groove 30 in the bottom of the chute, so as to prevent any possible leakage of material The end gate is supported by a lever C, and this lever consists of two angular side sections 31, fulcrumed at the junction of their members on the sides of the chute B² through the medium of suitable pivot-pins 32, and the two side sections 31 are connected at the back by a cross-bar 33 and at the front by a second cross-bar 34, the latter cross-bar being secured to the end gate 29 by bolts or rivets 35 or equivalent devices, as shown in Fig. 2. When the end gate 29 is closed, the upper member of each side section of the lever C is horizontal and the other member inclines downwardly, being parallel with the top and bottom of the chute, as shown in Fig. 1. An arm 36 is secured to the lower member of a side section 31 of the lever C, which arm extends horizontally beneath the upper member of the side section of the lever, as shown in Fig. 1, and a weight 37 is adjustably mounted on the said arm 36. This weight is adapted to regulate the rapidity with which the end gate 29 shall fall from its open to its closed position. If the weight 37 is brought quite close to the lever, the gate 29 will fall with its full force of gravity and will be retarded in its downward movement proportionately as the weight 37 is carried toward the outer end of said arm 36.

A latch-lever D is employed in adjustable connection with the operating-lever C of the end gate. This latch-lever D is of the elbow type and is fulcrumed upon a suitable standard 38, secured to the upper arm 22 of the scale A, as shown in Fig. 2. The upper end of the lever D is connected by links 39 with an eye 40 or its equivalent, adjustably connected with the upper member of the weighted side section of the operating-lever C. The upper movement of the upper member of the latch-lever D is limited by a stop 41, secured upon the upper portion of the standard 38, which upper portion of the standard is inclined, as shown in Fig. 2. The lower member of the latch-lever D is provided with a pivoted finger 42, which is free to move outwardly from the upright of the scale, but is prevented from moving toward the said upright. This latch-lever D is used in connection with a releasing device E. The releasing device E usually consists of a block 43, adjustably attached to the heel portion of the scale-arm 44 by a screw 45, provided with a suitable nut, as shown in Fig. 1, so that the block 43 may be rocked upon its supporting-screw and held in adjusted position, and a keeper-screw 46 is passed upward through the block 43, the upper end of which keeper-screw is beveled at opposite sides.

In operation when the end gate 29 is raised, as shown in Fig. 2, the rear portion of the lever C is rocked downward, and the finger 42 of the latch-lever D will pass over the beveled portion of the keeper-screw 46 and rest against its inner beveled face, as shown in said Fig. 2. When the keeper-screw is straight, as shown in Fig. 2, and the scale-beam 44 is brought to a balance, the finger 42 will slowly pass over the beveled surface of the keeper-screw 46 and will not have a decided downward bearing on the said screw, and consequently will not tend to force the heel of the scale-beam downward to any appreciable extent. Since the end gate 29 drops to its closed position as soon as the finger 42 escapes from the keeper-screw, it is obvious that when the keeper-screw is straight but little time will elapse between the actual balance of the scale-beam and the dropping or closing of the end gate 29. If, however, the keeper-screw be inclined outwardly, the finger 42 of the latch-lever D will more quickly release itself from the keeper-screw, as it will tend to press the heel of the scale-beam downward, and the end gate will close very quickly. The adjustment of the releasing device may be made in connection with the adjustment of the weight 37, and such adjustments are made to adapt the machine to weighing grain of various kinds. It will be understood that the scale-beam 44 is properly balanced when the parts are set up on the scale-platform.

The weight connecting with the gate-lever C enables the machine to be readily adjusted for slight variations of grain in transit. The principal adjustment, however, is made at the releasing device E.

I desire it to be understood that a friction-roller may be placed at the end of the finger 42 of the lock-lever D whenever such addition may be found desirable.

Having thus described my invention, I claim as new and desire to secure by Letters Patent—

1. In a weighing and bagging machine, a bagging device adapted to be supported on a scale-platform, a chute supported adjacent said bagging device and provided with a gate, an operating-lever for said gate, a locking-lever connected with said gate-operating lever and having a pivoted finger, and a vertically-adjustable keeper on the scale-beam and adapted to engage with the said finger, as and for the purpose set forth.

2. In a weighing and bagging machine, a bagging device adapted to be supported on a scale-platform, a chute supported adjacent said bagging device and provided with a gate, a lever operating said gate, a lock-lever connected with said gate-operating lever and having a pivoted finger and an adjustable keeper mounted on the scale-beam and adapted for engagement with said lever, as set forth.

3. In a weighing and bagging machine, a bagging device adapted to be supported on a scale-platform, a chute supported adjacent said bagging device and provided with a gate, a lever operating said gate, a lock-lever connected with said gate-operating lever and having a pivoted finger, and a keeper vertically adjustable on the scale-beam and having a beveled upper edge on which said finger is adapted to ride, as and for the purpose set forth.

4. In a weighing and bagging machine, a bagging device adapted to be supported on a scale-platform, a chute supported adjacent said bagging device, a lever fulcrumed on the side of said chute and carrying a gate adapted to close the end of the same, an arm secured to said lever between its fulcrum-point and the said gate, a weight adjustable on said arm, a bell-crank locking-lever having one arm connected with said gate-operating lever, and the other arm provided with a pivoted finger, and a vertically-adjustable keeper mounted on the scale-beam and adapted to engage with said finger as set forth.

5. In a weighing and bagging machine, the combination, with a platform-scale, a bag-supporting device carried by the platform of the scale, a chute arranged to deliver material to the said bag-supporting device, and a lever-operated end gate for the said chute, of a vertically-adjustable keeper, a lock-lever having a pivoted finger arranged for engagement with the said keeper, and a connection between the lock-lever and the gate-lever, whereby the end gate is held in an upper position and is permitted to drop because of the positions assumed by the balance-beam of the scale during the process of weighing, as described.

6. In a weighing and bagging machine, the combination, with a scale-platform, a bag-supporting hopper located upon the platform of the scale, and a support for the bag adjustable to and from the said hopper, of a chute connected with the bag-supporting hopper, a regulating-gate for the chute, an end gate for the chute, a weighted operating-lever for said end gate, a lock-lever provided with a pivoted finger, said lever being connected with the gate-lever, a bearing adjustably mounted on the balance-beam of the scale, and an adjustable keeper mounted in the said bearings and provided with a tapering upper end arranged for engagement with the finger of the lock-lever, all arranged for operation, as described.

ALONZO CEMERRILL BOSWORTH.

Witnesses:
JOHN A. CARPENTER,
JOHN F. CARPENTER.